Patented Feb. 13, 1940

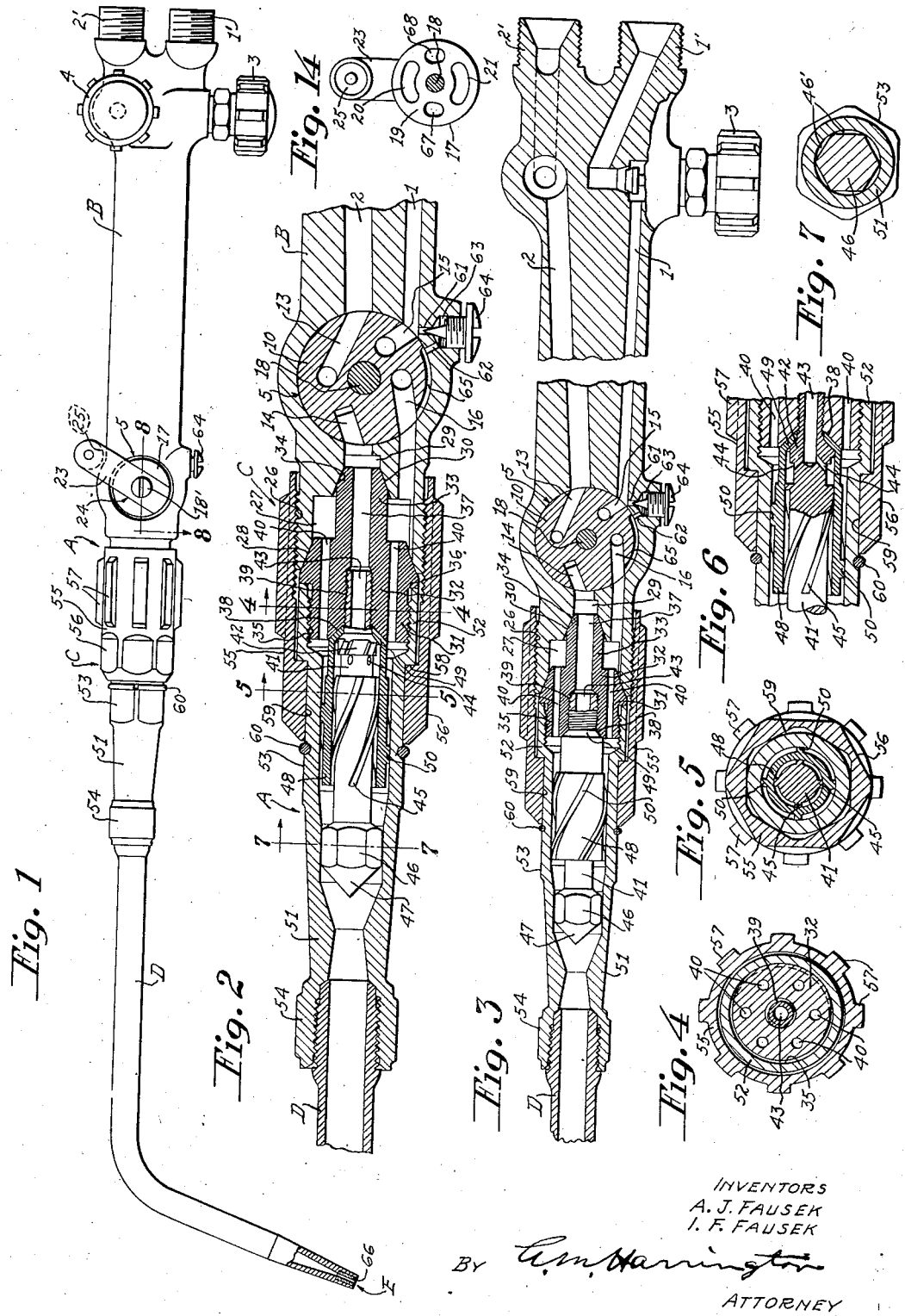

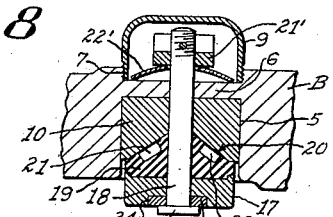
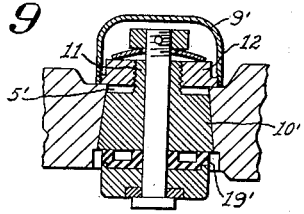
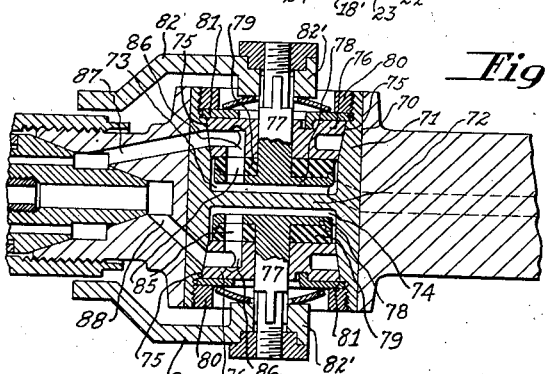
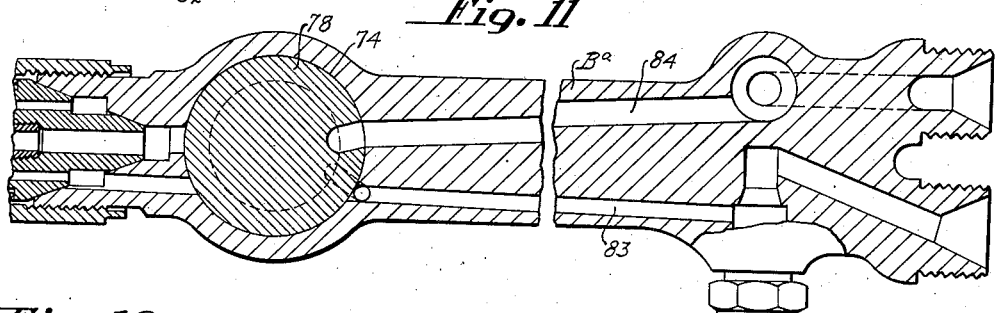
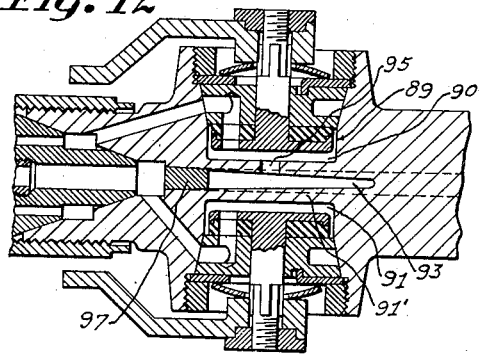
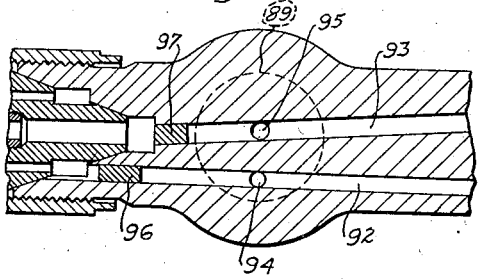

2,190,356

UNITED STATES PATENT OFFICE 2,190,356

TORCH

Arthur J. Fausek and Irwing F. Fausek, Clayton, Mo.

Application April 27, 1936, Serial No. 76,551

1 Claim. (Cl. 158—27.4)

This invention relates generally to torches, and more specifically to gas-burning torches, an important object of the invention being to provide a torch of this type with rotary cut-off means operable in a manner to cut off the supply of fuel gas and oxygen to the nozzle of the torch when in the use of the improved torch it is desired to temporarily extinguish or diminish the flame at the nozzle of the torch.

Another important object of the present invention is to provide an improved mixer for the fuel gas and oxygen which is commingled to produce a combustible mixture that is burned at the nozzle of a gas-burning torch. Among the various features of the improved mixer is the provision of spirally arranged passageways through which the fuel gas and oxygen move just prior to commingling of said fuel gas and oxygen. Because of the provision of the spiral passageways mentioned, backfiring of the torch is effectively prevented, and additionally whirling motion is imparted to the fuel gas and oxygen which aids in complete admixture of said fuel gas and oxygen when they are brought into mixing contact with each other within the mixer.

Still another important feature of the invention is the construction and arrangement of the handle portion of the torch which includes fuel gas and oxygen passageways that are drilled through said handle portion from end to end thereof, and which are so combined with the rotary cut-off means of the torch as to provide for the control of the flow of fuel gas and oxygen through said passageways.

Fig. 1 is a side elevation of the improved torch.

Fig. 2 is an enlarged, fragmentary, longitudinal section through the torch illustrating the rotary cut-off means and the mixer thereof.

Fig. 3 is a view similar to Fig. 2, but on a slightly reduced scale, and illustrating more of the handle portion of the torch.

Fig. 4 is a cross-section taken on line 4—4 of Fig. 2.

Fig. 5 is a cross-section taken on line 5—5 of Fig. 2.

Fig. 6 is a fragmentary, sectional view of a portion of the torch illustrating parts of the mixer thereof.

Fig. 7 is a cross-section taken on line 7—7 of Fig. 2.

Fig. 8 is an enlarged, fragmentary section taken on line 8—8 of Fig. 1.

Fig. 9 illustrates a modified form of the rotary cut-off means of the torch.

Fig. 10 is a fragmentary, horizontal, sectional view through a torch illustrating still another form of rotary cut-off means.

Fig. 11 is a fragmentary, vertical section taken through the structure illustrated in Fig. 10.

Fig. 12 is a fragmentary, horizontal, sectional view through a torch illustrating yet another form of rotary cut-off means.

Fig. 13 is a fragmentary, vertical section taken through the structure illustrated in Fig. 12.

Fig. 14 is an elevation looking at the face of a rotary element of the cut-off means.

In the drawings, wherein are shown for the purpose of illustration, merely, several embodiments of the invention, A designates the improved torch generally. The torch A comprises a handle portion B, a mixer structure C attached to said handle portion at its forward end, a discharge conductor D extended forwardly from said mixer structure, and a nozzle E at the outer end of said discharge conductor.

The handle portion B of the torch A is of solid construction, as shown to the best advantage in Figs. 2 and 3, and formed longitudinally through said handle portion are communicating passageways which provide a port 1 for the passage of fuel gas. In like manner the handle portion B has formed longitudinally therethrough communicating passageways which provide a port 2 for the passage of oxygen. An important feature of the invention is that by employing a handle portion of solid construction the ports 1 and 2 for passage of fuel gas and oxygen may be drilled through said handle portion. At the tail end of the handle portion screw-threaded extensions 1' and 2' are provided which receive suitable coupling devices (not shown) for attaching to the torch flexible conductors through which fuel gas and oxygen are conducted from containers to the torch. Also adjacent to the tail end of the handle portion B valve mechanisms are provided for regulating passage of fuel gas and oxygen through the ports 1 and 2, a valve mechanism 3 being associated with the fuel gas port 1 and a valve mechanism 4 being associated with the oxygen port 2.

Formed transversely of the handle portion B of the torch adjacent to the forward end thereof is a cavity 5. This cavity is open at one side of the handle portion of the torch, as shown to the best advantage in Fig. 8, and at its inner end the cavity terminates at a wall 6 within the handle portion. At the side of the handle portion of the torch opposite to the side at which the cavity 5 is open a shallow cavity 7 is formed, the wall of this cavity being screw-threaded as shown in Fig.

8 so as to screw-threadedly receive a cap 9 which serves a purpose to be hereinafter set forth.

Seated in the cavity 5 is an insert 10, which preferably is formed of relatively hard material. This insert may be secured in place within the cavity 5 in various ways. For instance, when the insert is of constant diameter as shown in Fig. 8, it may be treated, prior to being arranged in place within the cavity, so as to shrink the insert, after which it is arranged within the cavity and is permitted to resume its normal dimensions. In this manner a binding action is set up between the insert and the wall of the cavity, which securely retains the insert in place. Also, if preferred, a cavity 5' of tapered formation may be employed as shown in Fig. 9, into which a correspondingly tapered insert 10' may be forced to cause the insert to be securely fixed in place within the cavity. It will be noted that the structure illustrated in Fig. 9 differs from the structure of Fig. 8 in respects other than with regard to the shapes of the cavity 5' and the insert 10'. For instance, the insert 10' of Fig. 9 includes a screw-threaded extension 11 that receives a disk 12 which closes the smaller end of the cavity 5' and prevents displacement of the insert from the cavity. Also this disk is exteriorly screw-threaded and it screw-threadedly receives an interiorly screw-threaded cap 9'.

By referring to Figs. 2 and 3 it will be noted that the insert 10 is provided with a pair of passageways 13 and 14 which constitute parts of the oxygen port formed longitudinally through the handle portion of the torch. Also this insert is provided with a pair of passageways 15 and 16 which constitute parts of the fuel gas port of the torch. It will be noted that the associated passageways 13 and 14 and the associated passageways 15 and 16 are out of communication with each other. The rotary cut-off means of the torch of which the insert 10 forms a part includes also an element 17, which is supported for rotary movement by a bolt 18. This element has fixed to it a facing member 19 formed of suitable material (see Fig. 8) provided with a tapered inner portion, which is seated in a correspondingly shaped cavity 20 formed in the insert 10. The facing member 19 is provided with passageways 21 and 22 which are formed in the inner face of said facing member, and these passageways are movable into and out of positions where they place the associated passageways 13 and 14 and the associated passageways 15 and 16 in communication with each other. The bolt 18 passes through openings formed through the element 17, the facing member 19, the insert 10, and the wall 6, said bolt having a head 18' at one end which contacts with the outer face of the element 17, as shown in Fig. 8, and being provided at its opposite end with a nut 21 which is enclosed by the cap 9. In order to yieldingly hold the bolt 18 and the element 17 with its associated facing member in their proper assembled relation, a dish-shaped element 22, formed of suitable resilient material, is interposed between the nut and the outer face of the wall 6. This element 22 tends to draw the tapered face of the facing member into close working contact with the correspondingly shaped face of the insert 10. It will be noted that the structure illustrated in Fig. 9 differs from the structure of Fig. 8, inasmuch as the contacting faces of the facing member 19' and the insert 10' of Fig. 9 are flat instead of tapered as in Fig. 8. In order to provide for convenient rotation of the element 17 with its associated facing member 19, an arm 23 is provided. This arm is seated in a depression 24 formed in the outer face of the rotatable element 17 and is held in place by the bolt 18. Also, the arm 23 has fixed to its outer end a knurled thumb piece 25 which overhangs the handle portion of the torch.

By referring to Figs. 2 and 3 it will be noted that the forward end of the handle portion B of the torch A is exteriorly screw-threaded, as indicated at 26, and that said forward end of said handle portion is provided with a cavity 27 having a tapered forward wall portion 28. Also, this cavity communicates with a passageway 29 which opens into the cavity 5 in which the rotary cut-off means of the torch is disposed, said opening 29 being provided with a tapered forward wall portion 30.

Disposed adjacent to the forward end of the handle portion of the torch and in part within the cavity 27 and the passageway 29 formed therein is the mixer of the improved torch. The mixer includes a head portion 31 which is provided with a tapered circumferential face 32 that contacts with the tapered wall portion 28 at the forward end of the cavity 27. The head portion 31 includes also an extension 33 which projects rearwardly and is provided with a tapered, annular face 34 that contacts with the tapered wall portion 30 of the passageway 29. The forward portion of the head 31, which is of reduced diameter, is provided with external screw-threads 35, and an annular face 36 providing an abutment is located at the rear end of this screw-threaded portion of the head. Formed centrally through the head 31 is a passageway 37 which forms a part of the oxygen port extended through the torch, and said passageway 37 communicates with the passageway 29 formed in the forward portion of the handle portion of the torch. At the forward end of the head 31 the passageway 37 communicates with a flared opening 38, and rearwardly of said flared opening the passageway is provided with screwthreads 39. Formed through the head 31 is a circular row of passageways 40, said row of passageways being disposed so as to surround the central passageway 37, as shown in Fig. 4, and being open at the rear and front walls of the main body portion of the head.

Screwed into the screw-threaded forward portion of the central passageway 37 formed through the head 31 is the screw-threaded rear end portion of a stem 41 which forms a part of the mixer. The stem 41 at the forward end of the rear screw-threaded portion thereof is provided with a portion 42 of slightly increased diameter, and the rearmost face of this portion 42 is tapered, as shown to the best advantage in Fig. 6. The rear portion of the stem 41 has a centrally located passageway 43 formed longitudinally therethrough which is open at the rear end of said stem, said passageway being extended forwardly to a point in approximate alinement with respect to the forward face of the portion 42 of the stem (see Fig. 6). At points adjacent to the forward face of the portion 42 of the stem 41 short, angularly extended ports 44 are formed in the stem, these ports at their inner ends communicating with the passageway 43 and at their outer ends being open at the outer face of the stem.

Formed on the stem 41 forwardly of the enlarged portion 42 is a plurality of spirally arranged ribs 45. The portion of the stem on which the spiral ribs 45 are formed is of very slightly greater diameter than the portion of the stem located between the rear ends of said ribs and the forward face of the portion 42 of the stem. Also these ribs extend forwardly of the stem to points just short of the non-circular or multi-faced head 46 located at the forward end of the stem. As shown to the best advantage in Figs. 2 and 3, the head 46 of the stem is provided with a tapered portion 47.

Surrounding the stem 41 of the mixer of the torch is a sleeve 48 which is provided with a tapered wall portion 49 at its rear end. When the mixer is in its assembled condition the tapered wall portion 49 thereof is interposed between and is tightly gripped by the face of the flared opening 38 at the forward end of the passageway 37 formed through the mixer head 31 and its extension 33, and the tapered rear face of the portion 42 of the stem 41 (see Fig. 6). In this manner the sleeve is securely maintained in place. The inner face of the sleeve contacts closely with the outer faces of the spiral ribs 45 formed on the stem, and on its outer face said sleeve itself is provided with similar spiral ribs 50 which extend longitudinally thereof (Fig. 3). The spiral ribs 50 extend forwardly to a point in approximate alinement with respect to the spiral ribs 45 of the stem, so that, like the ribs 45, the spiral ribs 50 of the sleeve terminate short in a rearward direction of the non-circular or multi-faced head 46 of the stem of the mixer.

Surrounding the forward portion of the mixer parts thus far described is a tubular element 51 which provides the chamber of the mixer. This tubular element has an enlarged, interiorly screw-threaded rear portion 52 which screw-threadedly engages the screw-threaded forward portion of the head 31 of the mixer, the rear face of said tubular element contacting with the abutment face 36 of said mixer head, as shown in Figs. 2 and 3. The tubular element 51 at a point intermediate its ends is provided with a non-circular or multi-faced portion 53, and at the extreme forward end of said tubular element an interiorly screw-threaded boss portion 54 is provided, into which the exteriorly screw-threaded rear end of the discharge conductor D is screwed. It is to be noted that the bore of the tubular element 51 is of varying diameters; that is to say, the portion thereof enclosing the spirally ribbed portions of the mixer is of such diameter that the face of said portion contacts closely with the top faces of the spiral ribs formed on the sleeve 48. Forwardly of the portion referred to the diameter of the bore of the tubular element is reduced slightly to provide a portion that receives the non-circular or multi-faced head 46 of the stem of the mixer, the corners of the various adjacent faces of said head contacting with the inner face of the tubular element, and spaces 46' being present between the flat faces of said head and the inner face of the tubular element, through which spaces gas may pass. In advance of the location of the head 46 of the stem of the mixer the bore of the tubular element 51 is provided with an associated pair of tapered portions extended in opposite directions, which aid in obtaining complete admixture of the fuel gas and oxygen as they pass through that portion of the tubular element.

In order to secure the mixer to the handle portion of the improved torch, we employ a coupling member 55 which is in the form of a nut having a non-circular or multi-faced portion 56. Also the outer face of the coupling member rearwardly of the multi-faced portion 56 is provided with a plurality of longitudinally extended, outstanding ribs 57 which aid in securing a firm grip on the coupling member when same is being rotated in securing the mixer to the handle portion of the torch. The coupling member 55 is provided with an internal abutment face 58 which engages a corresponding external abutment face formed on the tubular element 51, so that when the coupling member is screwed longitudinally of the screw-threads 26 of the handle portion the tubular element and the mixer parts associated therewith will be drawn rearwardly into their proper assembled relation with respect to parts of the handle portion of the torch.

An important feature of the invention is that the opening 59 formed through the forward portion of the coupling member 55 is of a multi-faced shape corresponding to the shape of the multi-faced portion 53 of the tubular element 51 of the mixer structure. Also this opening 59 is only slightly larger than the multi-faced portion 53 to permit of said opening passing over said multi-faced portion when the coupling member is being moved rearwardly of the tubular element into assembled relation with the mixer structure. By making the opening 59 of approximately the same shape as the multi-faced portion 53 of the tubular element 51, said portion 53 may be made larger than it would if the opening 59 were circular, as the various corners of the multi-faced portion 53 in that case would have to come within the diameter of a circular opening and hence the entire multi-faced portion have to be made smaller with smaller flat faces. The fact that the opening 59 of the coupling member 55 is non-circular or multi-faced does not affect the even distribution of contact between the wall of said opening and the circular portion of the tubular element 51 which said opening surrounds when the coupling is drawn rearwardly in its normal assembled position, as the circumferential face of said portion of the tubular element contacts with the various flat faces of the opening 59, as shown in Fig. 5.

In order to retain the coupling member 55 in its position adjacent to the rear end of the tubular element 51 so that the abutment faces within the coupling member and on the tubular element contact with each other, we provide the outer face of the tubular element with an annular groove and seat in this groove a split, contractile ring 60. This ring, when in place, acts as an abutment which prevents forward movement of the coupling member with respect to the tubular element.

When in the use of the improved torch disclosed herein the rotary cut-off is set so that the passageways 20 and 21 connect the associated passageways 13 and 14 and the associated passageways 15 and 16 formed in the insert 10, oxygen passes forwardly through the port 2 to the passageway 37 in the mixer head 31, and fuel gas passes forwardly through the port 1 into the cavity 27 at the forward end of the handle portion of the torch. The oxygen passes from the passageway 37 into the passageway 43 formed in the stem 41 of the mixer and moves through the angularly disposed ports 44 to the rearward portion of the interior of the sleeve 48, said oxygen then passing through the spiral passageways provided between the spiral ribs 45 on the mixer stem and being discharged at the forward ends of said spiral passageways. Simultaneously the fuel gas passes from the cavity 27 through the ports 40 formed in the mixer head 31, and then moves through the spiral passageways between the spiral ribs 50 on the mixer sleeve 48 and is discharged at the forward ends of said spiral passageways. When the fuel gas and oxygen are discharged at the forward ends of the spiral passageways formed by the spiral ribs 45 and 50, said fuel gas and oxygen are thoroughly commingled due to the whirling motion imparted thereto by passage through the spiral passageways, and the combustible mixture produced by commingling the fuel gas and oxygen as described moves through the spaces between the flat faces of the multi-faced head 46 and the inner face of the tubular element 51 and passes forwardly through the discharge conductor D to the nozzle E of the torch, where said combustible mixture is burned.

With respect to the spiral passageways of the mixer through which the fuel gas and oxygen pass, it is pointed out that the depth of the spiral passageways produced by the ribs 45 and the circumferential face of the stem 41 of the mixer and the inner face of the sleeve 48 produces a thin, spirally moving sheet of fuel gas. Also, because of their spiral arrangement, the passageways are substantially long. This is true also of the spiral passageways produced by the spiral ribs 50 and the circumferential face of the sleeve 48 and the inner face of the tubular element 51, these spiral passageways being of such depth that thin, spirally moving sheets of oxygen are provided which are substantially long because of the spiral arrangement of the passageways. It has been found in actual practice that the spiral passageways for the fuel gas and oxygen effectively prevent back-firing of the torch where the spiral sheets of gas and oxygen passing therethrough are thin and long, as the back flash will not follow the shallow, long, spiral passageways.

In order to provide for a small pilot flame at the nozzle of the torch when the cut-off means of the torch is shut off, we provide by-pass ports 61 and 62 (Figs. 2 and 3) which lead from the fuel gas port to a screw-threaded cavity 63. Arranged in the cavity 63 is a regulating screw 64 which acts as a valve, said screw being provided with a tapered portion which enters the by-pass port 61. The by-pass port 62 communicates also with a curved passageway 65 formed in the insert 10 which leads to the portion of the fuel gas port forwardly of the cut-off means. Because of this arrangement a slight flow of fuel gas is maintained to the nozzle of the torch when the torch has been temporarily shut off through use of the cut-off means, and this slight flow of fuel gas will burn at the nozzle of the torch to maintain a pilot light for re-igniting the torch.

Also the cut-off means of the torch is so arranged that flow of fuel gas to the nozzle of the torch is cut off slightly later than the oxygen when the cut-off means is operated to shut off the torch, while said fuel gas is turned on slightly earlier than the oxygen when the rotary cut-off is moved to the open position. This arrangement eliminates back-firing within the forward part of the torch, which would entirely extinguish the flame at the nozzle of the torch.

By preference we provide the nozzle of the torch with a sleeve insert 66 (Fig. 1), which, if desired, may be formed of relatively hard material so as to increase the durability of the nozzle of the torch.

By referring to Fig. 14 it will be noted that in addition to the curved passageways 20 and 21 for connecting the associated passageways 13 and 14 and 15 and 16 formed in the insert 10 as already described herein, the facing element 19 of the rotary element 17 of the cut-off means is provided with openings 67 and 68 formed in the face thereof. By this arrangement the more or less sharp edges of the ends of the ports with which the facing element contacts are never in contact with the face of said facing element when the cut-off means is in either the open or closed position, and therefore the danger that the face of the facing element will be indented by sustained contact with said face of the edges of said ports is eliminated. When the cut-off means is in the open position, the ends of the associated ports 13 and 14 and 15 and 16 are, of course, in communication with the curved passageways 20 and 21, while when the cut-off means is in the closed position the end of one of each associated pair of ports of the insert 10 is at one of the curved passageways of the facing element while the end of the other of each pair of associated ports is at one of the openings 67 or 68, whereby said associated ports are sealed off by the material of the facing element located between the curved passageways and the openings 67 and 68.

In the form of the invention shown in Figs. 10 and 11, the handle portion B$^a$ of the torch is provided with an opening 70 extended transversely therethrough, in which a tubular insert 71 is fixedly arranged in any suitable manner. The insert 71 is provided with a wall 72 intermediate of its ends which divides the interior of the tubular insert into two cavities 73 and 74. The wall of each of the cavities referred to is provided with a tapered portion 75, and fixed valve members 76 are arranged with the correspondingly tapered circumferential faces thereof in binding contact with said tapered wall portions 75. The fixed valve member in each cavity 73 and 74 has a central opening formed therethrough, through which a valve stem 77 extends, this valve stem being provided with a head 78 at its inner end which is provided with a facing element 79. The opposite outer ends of the insert 71 are internally screw-threaded, and annular nuts 80 are screwed into said screw-threaded portions against plates 81 which contact with the associated fixed valve members 75 so as to retain them in place. At the outer ends of the valve stems 77 arms 82 are fixed which are connected by a suitable thumb piece (not shown), whereby said arms may be moved simultaneously to operate the valves in unison. Also interposed between the sleeve portion 82' of each of the arms 82 and the adjacent plate 81 is a dished, resilient element which tends to move the associated valve stem outwardly and thus maintain the valve facing in contact with the fixed valve member.

The handle portion of the structure shown in Figs. 10 and 11 is provided with a fuel gas port 83 and an oxygen port 84, the fuel gas port leading into the cavity 73 and the oxygen port leading into the cavity 74 (see Fig. 11). Also the head and facing element of each valve are provided with passageways 85 which are movable into and out of registration with passageways 86 formed in the fixed valve members 71, these passageways 86 in the fixed valve members being in communication with a fuel gas port 87 and an oxygen port 88 that are formed through the insert 71 and through portions of the handle portion of the torch and lead to the mixer of the torch.

It is to be noted that when the cut-off means of the structure shown in Figs. 10 and 11 are in the cut-off position, the pressure of the fuel gas and oxygen acts against the flat faces of the heads of the valves so as to force the valve facing elements into tight sealing contact with the fixed valve members and thus provide fluid-tight contacts between said parts. Also it is obvious that when the valves are moved to the open position, fuel gas and oxygen will pass through the registered passageways in the valve heads, valve facing elements, and fixed valve members to the ports 87 and 88 and through said ports to the mixer of the torch.

The structure shown in Figs. 12 and 13 is the same as the structure illustrated in Figs. 10 and 11, with the exception that no insert, such as the insert 71 of Figs. 10 and 11, is employed in the structure of Figs. 12 and 13. In Figs. 12 and 13 the transverse opening 89 formed in the handle portion of the torch is shaped and arranged to receive the various parts already described as being located within the hollow insert 71 of Figs. 10 and 11. The transverse opening of Figs. 12 and 13 is divided into two separate cavities 90 and 91 by a wall 91', and the fuel gas port 92 and the oxygen port 93 are formed through the handle portion so that they extend through this wall. Also the cavity 90 is placed in communication with the fuel gas port 92 by an aperture 94, while the cavity 91 is placed in communication with the oxygen port 93 by an aperture 95. In the form of the invention illustrated in Figs. 12 and 13, the fuel gas port and the oxygen port are plugged at points forwardly of the cut-off means, as shown at 96 and 97. The operation of the modified structure shown in Figs. 12 and 13 is the same as the structure of Figs. 10 and 11, as already described, and hence this operation need not be again explained.

We claim:

In a torch comprising a handle portion having longitudinal gas conduits therethrough and a transversely disposed recess therein, a mixer portion having conduits therethrough and a flame directing portion having a nozzle, the combination of a valve mechanism conveniently located in the transverse recess in the handle portion for conducting gases from their source of supply to the conduits of the mixer and controlling their rate of supply, characterized by a rotatable portion provided with ducts to be brought into registration with the gas conduits through the handle portion from the source of supply and those through the mixer portion and so arranged that upon operation of the rotatable portion of the valve mechanism one gas will be cut off before the other gas is cut off, and an independently controlled by-pass through the rotatable portion of the valve mechanism for supplying gas for a pilot light constantly in registration with the conduit from the source of supply.

ARTHUR J. FAUSEK.
IRWING F. FAUSEK.